Aug. 4, 1964 P. E. JANNIN 3,143,058
AUTOMATIC COFFEE-MAKING MACHINE
Filed Oct. 24, 1962 7 Sheets-Sheet 1

Fig.1

INVENTOR
PIERRE EUGENE JANNIN

P. E. JANNIN 3,143,058

AUTOMATIC COFFEE-MAKING MACHINE

Filed Oct. 24, 1962

INVENTOR
PIERRE EUGENE JANNIN

INVENTOR
PIERRE EUGENE JANNIN

United States Patent Office 3,143,058
Patented Aug. 4, 1964

3,143,058
AUTOMATIC COFFEE-MAKING MACHINE
Pierre Eugene Jannin, 1 Square Trudaine,
Paris 9, France
Filed Oct. 24, 1962, Ser. No. 232,682
Claims priority, application Luxembourg Oct. 31, 1961
14 Claims. (Cl. 99—283)

The present invention relates to automatic coffee-making machines of the type comprising four stations, namely a station for receiving a metered quantity of ground coffee, a station for compressing said metered quantity of ground coffee, a percolating station, and a washing station and further comprising four appropriate vessels which are presented successively and in rotation in front of said stations.

An object of the invention is to produce an automatic coffee-making machine which is both very simple to construct and reliable in operation.

To this end, the automatic coffee-making machine in accordance with the invention is characterized in that the four vessels referred to above are four canisters uniformly spaced apart over the periphery of a plate mounted in such manner that, as each cycle of operation takes place, said plate carries out an axial downward movement, a pivotal indexing movement through one quarter of a revolution and an axial lifting movement. The movements are effected under the action of a suitable driving mechanism which produces an action at the same time on means for operating a ground-coffee dispenser, on a device for compressing the ground coffee, on a valve for the admission of hot water to the percolating station, and on a valve for the admission of water to the washing station, in such a manner that after each indexing movement of said plate, a first canister receives a metered quantity of ground coffee, a second canister preceding said first canister is subjected to the compressing action, a third canister preceding said second canister has its top rim applied in fluid-tight manner against the mouth of a distributor for the supply of hot water under pressure and accordingly serves for the percolation of the coffee which then flows directly through the pierced base of said canister into the coffee cup which is placed beneath it, and a fourth canister preceding said third canister is subjected to the washing operation.

By virtue of this particular constructional arrangement, only a single driving member is required in order to produce by mechanical means all the movements which are necessary for the performance of a full cycle.

The invention also has for an object embodiments comprising at least one of the following characteristic features:

(a) The plate-driving mechanism comprises a rotary driving shaft designed and adapted to perform one full revolution per cycle of the machine. A coupling between the rotary driving shaft and the plate including a key and a member in which there are four slots displaced 90° with respect to each other. The key is inserted in each one of the slots in succession during the time required by the driving member to complete one quarter of a revolution as a result of a relative axial displacement of the key and of the slotted member and under the action of a cam which is also driven by said driving shaft;

(b) The key is integral with the plate, whilst the slotted member is integral with the driving shaft which carries a cam designed to produce action on an axial push-rod which is intended to thrust the plate downwards in opposition to the force of a spring;

(c) The plate is correctly held in each of four angular indexing positions by means of an elastic locking device;

(d) Each canister has a generally cylindrical shape, a pierced base which permits of the evacuation of the coffee and a grid disposed in the interior of the canister for the purpose of supporting the ground coffee. The top rim of the canister is covered with an elastic sealing joint having an inverted U section and intended to be fitted under a given pressure into the bottom of an annular groove having a corresponding shape. The annular groove is adapted to surround the mouth of the outlet through which the hot water under pressure is supplied to the percolating station;

(e) The washing station is fitted with a sprinkler head through which the water flows under pressure for propelling into the canister and to eliminate the used coffee inside the canister;

(f) The canister which is located at the percolating station and applied against the mouth of the outlet through which the hot water under pressure is discharged is locked in position by means of a cam device operated from the driving shaft of the machine;

(g) The admission of hot water to the percolating station and the admission of water to the washing station are controlled by electro-valves. The electric circuits supplying the said electro-valves include contacts operated by cams which are integral with the driving shaft referred to above;

(h) The percolating station further includes means for feeding sugar syrup from a gravity-feed tank under the control of an electro-valve which is also operated from an electric circuit comprising a contact operated by a cam which is integral with the driving shaft;

(i) The circuit controlling the electro-valve for the feeding of hot water to the percolating station additionally includes a push-button which permits the possibility of supplying an additional quantity of hot water to the percolating station;

(j) The push-button is supplied with current for an electric contact which closes only when a cycle of operation of the machine is completed;

(k) The cam which controls the feeding of hot water to the percolating station has a profile so designed to produce a first supply of very short duration for the purpose of effecting a wetting and a swelling of the ground coffee. The first supply is followed a few moments later by a second supply in which the entire quantity of required hot water is then discharged;

(l) The circuit supplying current to the motor which drives the rotary driving shaft includes a contactor which is initially energized under the control of a cam operated by an auxiliary motor, the cycle of the said motor being of shorter duration than that of the main motor; and (m) The electric circuit for the initial excitation of the motor of the machine at the start of a cycle of operation includes a contact which is operated as a result of the introduction of a coin inside a suitable device of any appropriate conventional type.

The invention will be more clearly understood from a reading of the following detailed description in conjunction with the accompanying drawings which show one embodiment of the invention which is given by way of example and not by way of limitation.

The automatic coffee-making machine as illustrated in FIGS. 1 to 4 comprises a base 1, for example of thick sheet-iron which supports a frame generally designated by the reference 2, and on which are mounted all the components of the machine.

The bottom portion of the frame 2 is constructed of a channel-iron 3 having downwardly-directed flanges and which supports a top channel-iron 8 by means of two upright members 4, 5 and two columns 6, 7.

Four small columns 11 which are fixed on the web of the bottom channel-iron 3 support a horizontal plate 12 on which is mounted a vertical floor-bearing 13 (FIG. 6) in which is journalled a main shaft 14 which is the output shaft of a reduction-gear unit 15 of a main electric motor 16.

Figure 2:
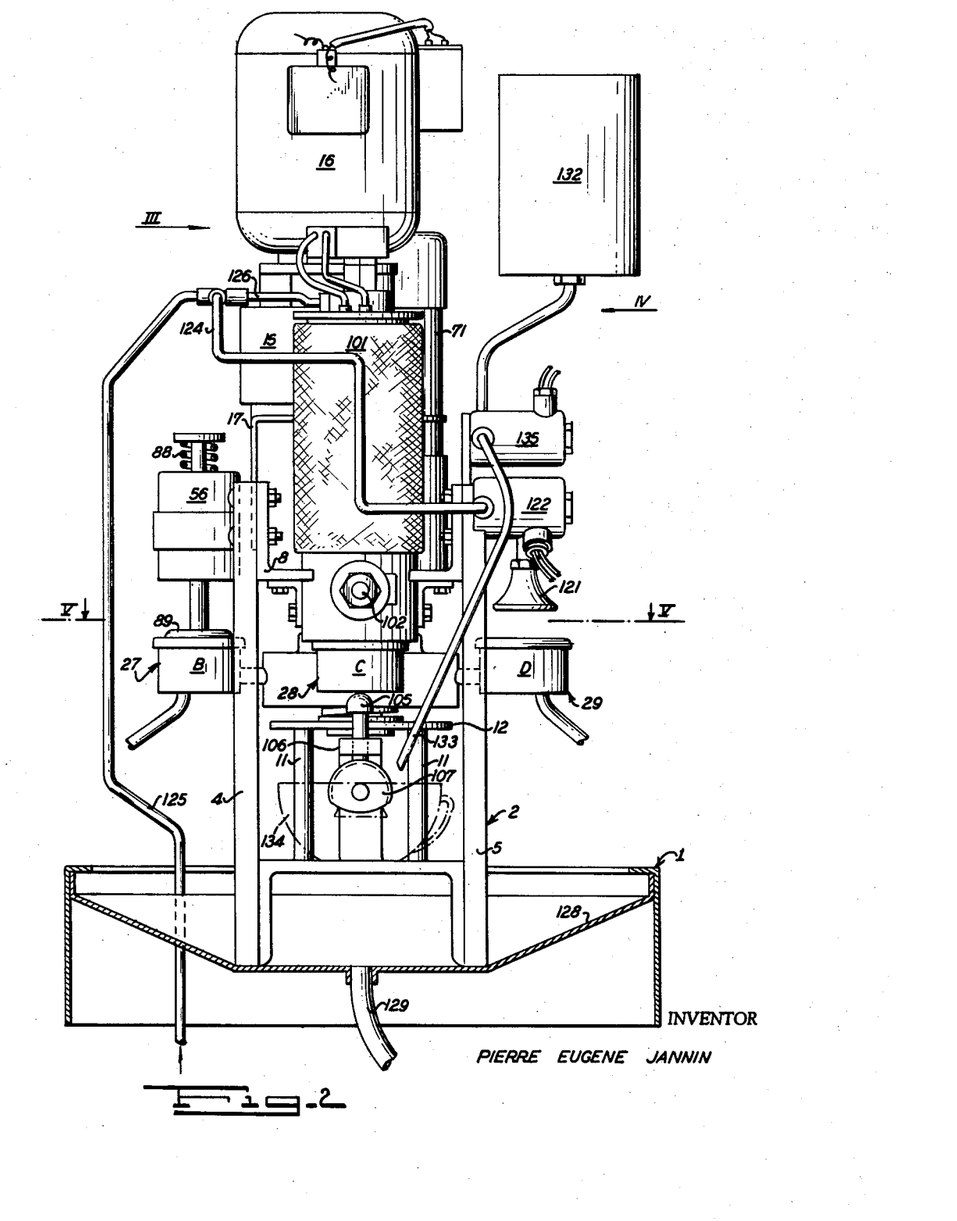
FIG. 2 is a front view of the machine on a larger scale.
Figure 3:
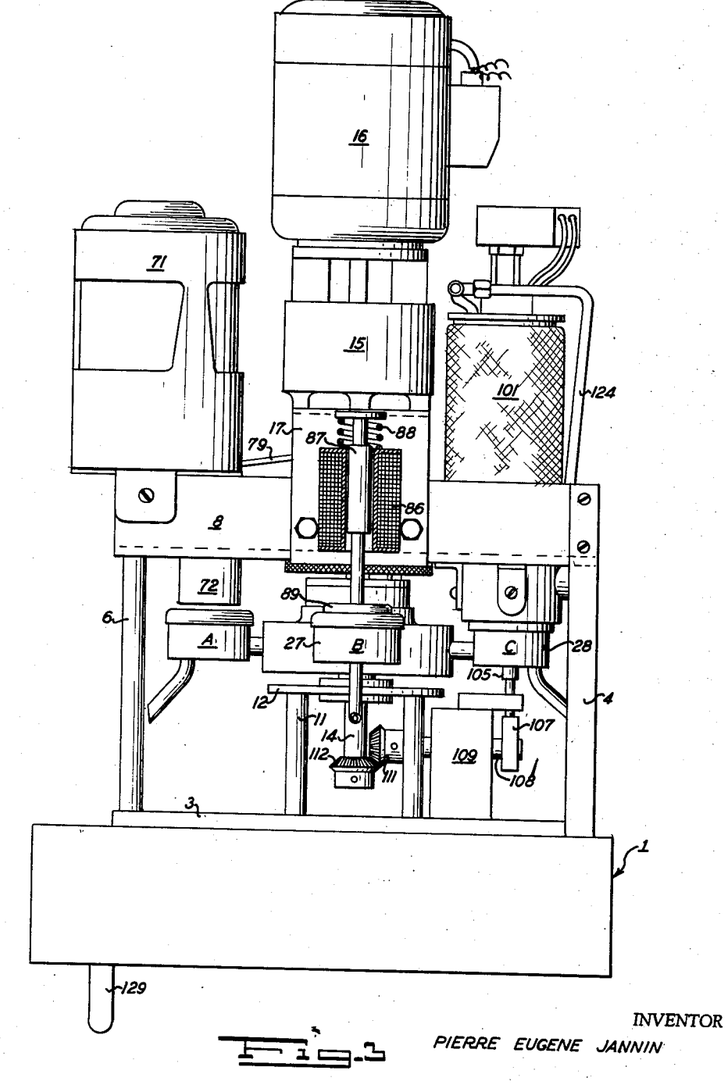
FIGS. 3 and 4 are side views as seen respectively by looking in the direction of the arrows III and IV of FIG. 2.

Motor 16 is supported by the casing of reduction-gear unit 15 while this latter is in turn fixed on a support 17 bolted on the top channel-iron 8 (FIGS. 2 and 3).

The external surface of the vertical floor-bearing 13 (FIG. 6) is cylindrical and serves as a stationary vertical pivot for a plate 21, the bore of which is fitted with a friction sleeve 22 of bronze, for example.

Figure 5:
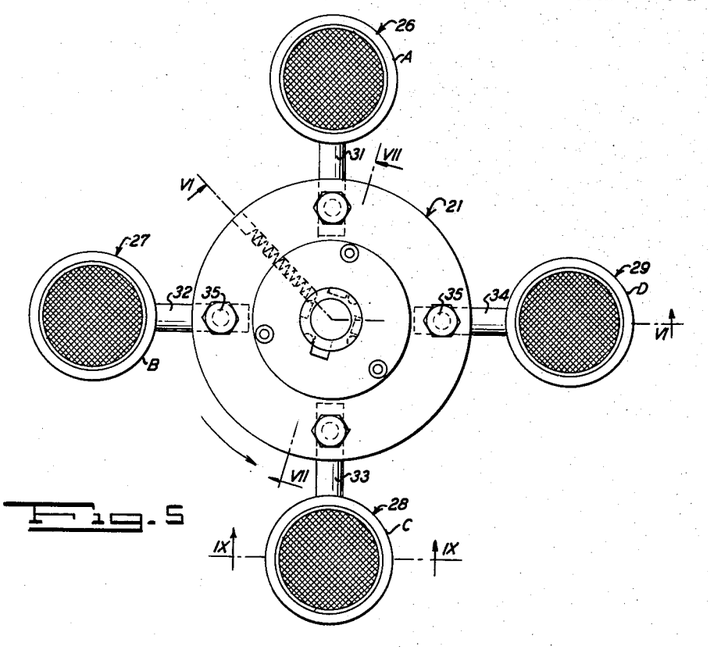
FIG. 5 is a horizontal cross-section only of the rotary unit taken along the line V—V of FIG. 2.

The plate 21 (FIG. 5) carries four canisters 26, 27, 28, 29 by means of arms 31, 32, 33, 34 which are respectively fitted in corresponding radial bores of said plate and held in position by means of clamping screws 35.

The machine comprises four stations, namely: a station A for receiving a metered quantity of ground coffee, a station B for compressing the coffee inside the canister, a percolating station C and finally a washing station D.

The plate 21 must accordingly be capable of successively taking up in space four angular positions at 90° so that each time the plate stops, a canister is always in position in a station, while the supply of a cup of coffee is obtained simply as a result of a rotation of the plate through one quarter of a revolution.

Figure 6:
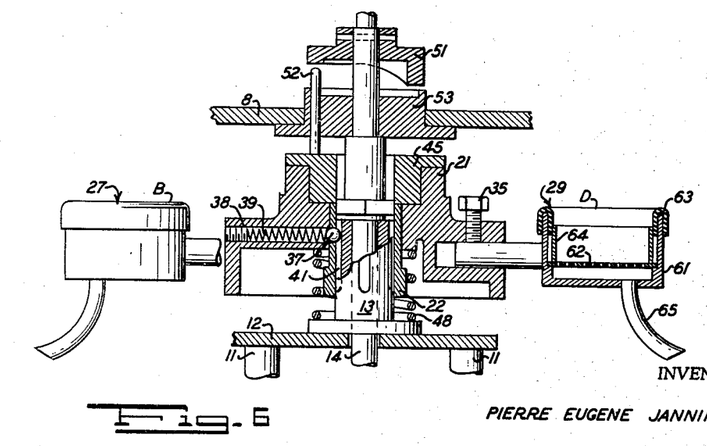
FIGS. 6 and 7 are vertical cross-sections taken respectively along the lines VI—VI (and VII—VII) of FIG. 5.

The accurate angular positioning of the plate 21 is ensured by means of an elastic locking device constituted by a ball 37 (as shown in FIG. 6) which is housed inside a radial bore 38 of said plate. Ball 37 is thrust by a spring 39 against the external cylindrical surface of the vertical floor-bearing 13 in which there are formed for this purpose four longitudinal grooves such as the groove 41. The grooves are uniformly spaced apart over the periphery of the cylindrical surface.

Figure 7:
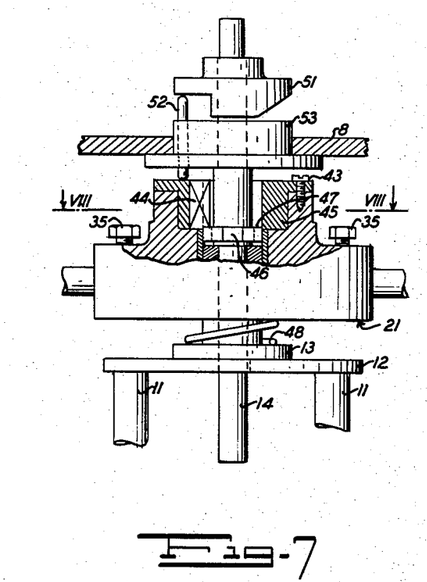
Figure 8:
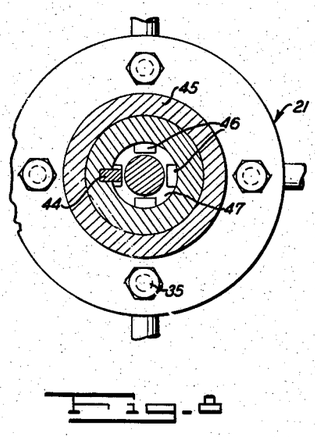
FIG. 8 is a fragmentary horizontal cross-section taken along the line VIII—VIII of FIG. 7.

The indexing movement of the plate 21 is effected from the central main shaft 14 of the machine by means of a system comprising a key 44 (as shown in FIGS. 7 and 8) which is integral with a flanged sleeve 45 which is fixed inside the plate 21 by means of screws 43. Key 44 is intended to engage successively, during a certain period of each cycle, inside one of the four slots such as the slot 46 which are formed in a collar 47 of the shaft 14.

When in the rest position, the key 44 is located immediately above the collar 47 and the plate 21 is urged upwards in this position by a restoring spring 48 (see also FIG. 6), the bottom end of which is applied against the annular flange or base of the floor-bearing 13 while the top end of spring 48 is applied against the underface of the plate 21.

For a short period of time, namely during the time which is necessary for plate 21 to perform one quarter of a revolution, key 44 can be engaged inside one of the slots 46 by means of a cam 51 which is keyed on the main shaft 14 and which thrusts the plate 21 downwards through the intermediary of a push-rod 52. Push rod 52 is slidably mounted inside a ring 53 which is secured to the web of the top channel-iron 8.

As each cycle of operation takes place, that is to say each time a cup of coffee is prepared, main shaft 14 performs one complete revolution. The shape of the cam 51 is such that, during this revolution, the plate 21 is thrust downwards by the cam 51 in opposition to the spring 48. Accordingly key 44 engages inside one of the slots 46 and plate 21 effects one quarter of a revolution, whereupon cam 51 releases push-rod 52. Therefore, spring 48 causes the plate to move upwards abruptly after it has completed one quarter of a revolution.

Figure 9:
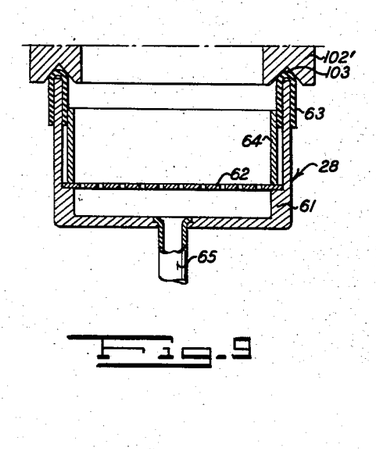
FIG. 9 is a fragmentary vertical cross-section taken along the line IX—IX of FIG. 5.

The four canister units are all identical and each unit such as, for example, the canister unit 28 (as shown in FIG. 9) includes: a cylindrical cup 61; a filter consisting of a circular grid 62 which rests on a shoulder formed in the vicinity of the cup bottom; an elastic sealing joint 63 of rubber or equivalent material having an inverted U-section and fitted over the top rim of the cup; and an internal cylindrical ring 64 which is force-fitted inside the cup so as to hold in position both the sealing joint 63 and the filter 62 at the same time. The bottom of the cup 61 is pierced and fitted with a pouring spout 65.

Figure 4:
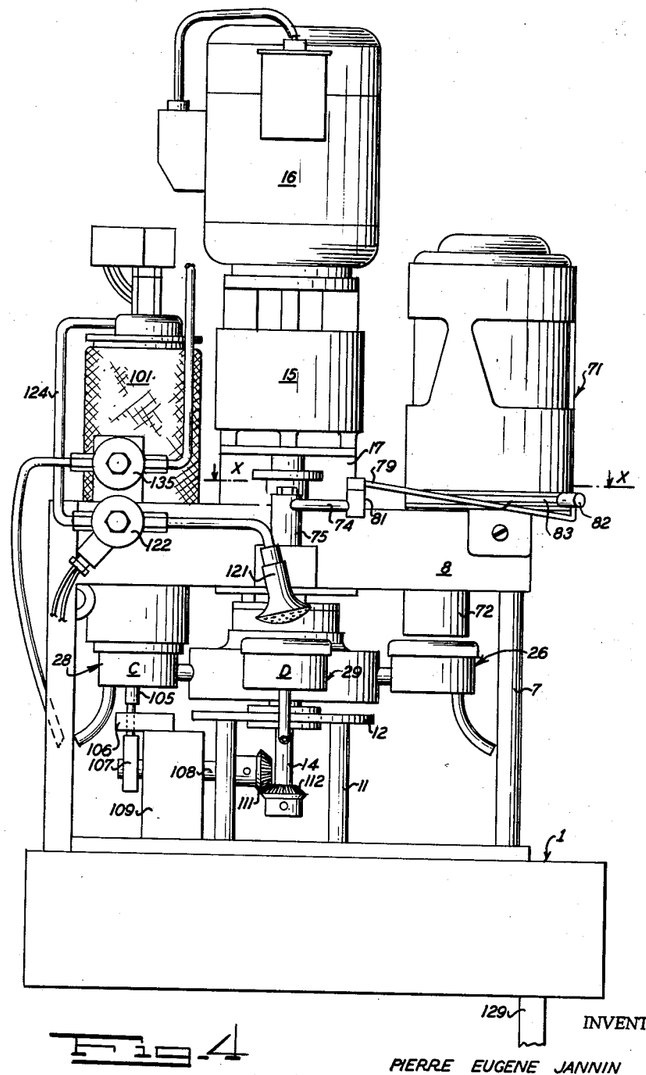

The station A (as shown in FIGS. 3 and 4) for receiving the ground coffee is provided with a dispensing apparatus 71 of any suitable type so designed that a metered quantity of ground coffee is discharged, each time the said dispensing apparatus is actuated, through a feed-chute 72 (FIG. 4) located directly above canister 26 which is ready to receive said metered quantity.

Figure 10:
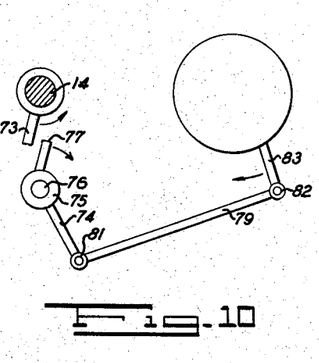
FIG. 10 is a fragmentary horizontal cross-section taken along the line X—X of FIG. 4.

The ground-coffee dispenser is actuated once per revolution of the main shaft 14 by means of a system comprising: a finger 73 (as shown in FIG. 10) which is integral with the main shaft 14; a lever 74 (see also FIG. 4) which is integral with a sleeve 75; a pin 76 about which the said sleeve is intended to pivot and which is integral with the top channel-iron 8; and extended portion 77 provided on said lever 74 and designed to be caught by the finger 73 during the movement of rotation of this latter; and a connecting-rod 79, one end of which is pivotally connected at 81 to the free end of the lever 74 while the other end thereof is pivotally coupled at 82 to the free end of a lever 83 designed to actuate the coffee powder dispenser 71.

In this form of embodiment, the coffee is introduced in the ready-ground state so as to form a reserve supply inside the dispenser 71.

The compressing station B (as shown in FIGS. 2 and 3) comprises an electro-magnet 86 with a plunger core 87, the rod of which is urged upwards by a spring 88. Core 87 carries at the bottom end thereof a piston 89 of suitable diameter to permit piston 89 to penetrate inside canister 27 which is located at this station and to compress the ground coffee in the canister.

The percolating station C is provided with a water-heater 101 (as shown in FIGS. 2 to 4) which may be an electric heater fitted with a distribution electro-valve 102 (as shown in FIG. 2) by means of which a stream of hot water under pressure is discharged into the canister 28. Canister 28 is positioned against a mouth 102' (as shown in FIG. 9) which is located at the bottom portion of the boiler 101. There is in mouth 102' an annular groove 103 in whose bottom is positioned the sealing joint 63 of the canister. The canister 28 is held forcibly pressed against mouth 102' of the boiler so as to withstand the pressure of the water which is fed into the canister. Accordingly a finger 105 (as shown in FIGS. 2 and 4) slides vertically inside a guide 106 attached to and integral with the frame of the machine is pushed against the bottom of canister 28 by a cam 107 of suitable profile and integral with a shaft 108 which is rotatably mounted horizontally in a block 109 which is also integral with the frame; shaft 108 carries a bevel gear 111 which meshes with another bevel gear 112 of the same size mounted on the bottom end of the main shaft 14 so that cam 107 effects one full revolution at the same time as main shaft.

The washing station D (as shown in FIGS. 2 and 4) is fitted with a small sprinkler head or nozzle 121 connected to the outlet of an electro-valve 122. Electro-valve 122 is fed directly with cold water via a pipe 124 which is connected to pipe 125 which supplies water under pressure to the machine.

Reference 126 (FIG. 2) shows the pipe which supplies cold water to the water-heater 101.

The washing water and the used coffee fall into a tray 128 and are withdrawn from this latter through a pipe 129.

A vessel 132 (as shown in FIG. 2) contains sugar syrup which is discharged from a pouring spout 133 directly into the coffee-cup 134 under the control of an electro-valve 135.

Figure 1:
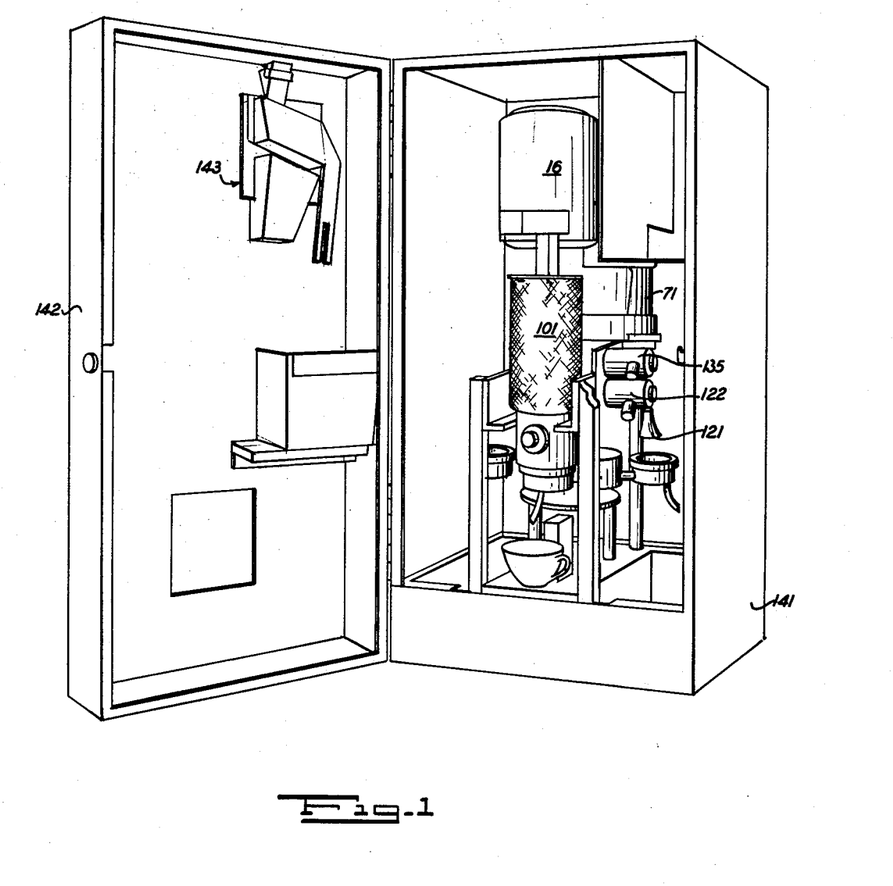
FIG. 1 illustrates in perspective the assembly of an automatic coffee-making machine in accordance with the invention.
Figure 11:
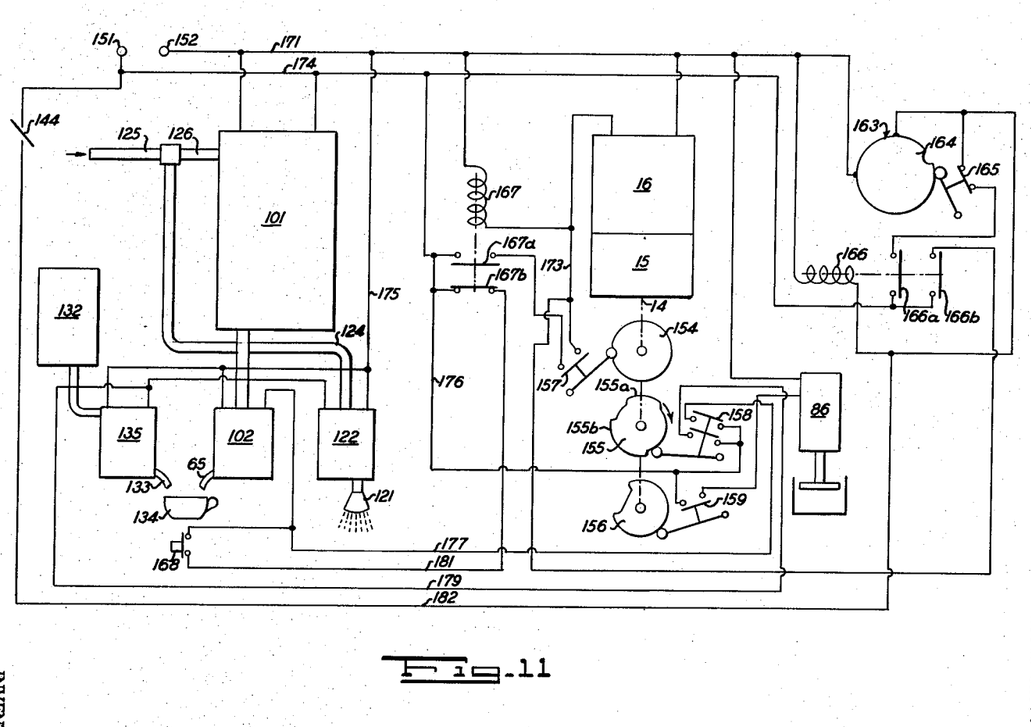
FIG. 11 is a diagram of the electric circuits of the machine.

The entire machine is housed inside a cabinet 141 (as shown in FIG. 1), the door 142 of which is fitted with apparatus 143 of any appropriate conventional type which is adapted to receive a coin and to transitorily close, at the moment at which the coin passes, an electric contact such as the contact 144 of a circuit of the type illustrated in FIG. 11, in such manner as to initiate a cycle of operation for the supply of a cup of coffee.

In the circuit diagram of FIG. 11, there can again be seen the electric water-heater 101, the percolation electro-valve 102, the washing electro-valve 122, the sugar syrup dispensing-valve 135, the electro-magnet 86 for compressing the coffee powder, and the main electric motor 16 with its reduction-gear unit 15.

The current is supplied to the two input terminals 151, 152. The electric water-heater 101 is fed directly from these two terminals.

The output shaft 14 of the reduction-gear unit 15 of the electric motor 16 carries three cams, namely, a cam 154 designed to control the circuit supplying the main motor 16, a cam 155 designed to control the electro-valves, and a cam 156 designed to control the compressing electromagnet 86. These three cams actuate respectively the three electric contact sets 157, 158, 159.

The machine additionally comprises a small auxiliary control motor 163 with reduction gear unit which drives a cam 164. Cam 164 is designed to operate a contact 165 controlling a contactor 166 which in turn operates a contactor 167. The contactors 166 and 167 are both of the two-pole-type. One terminal of the coil of the contactor 167 is permanently connected to the input terminal 152 of the machine through a wire 171, while the other terminal of said contactor coil is connected to the other terminal 151 of the machine through a circuit including wire 173, contact 166b of contactor 166, and wire 174.

A push-button 168 makes it possible, if so desired, to operate the electro-valve 102 for a further period of time in order to increase the ration of water in the event that the quantity supplied automatically is considered to be insufficient.

In the circuit diagram, the general water-supply pipe 125 is again shown together with the pipe 126 which serves to supply water to the water-heater 101 and the pipe 124 which supplies water 122 to the washing station.

The operation of the machine is as follows:

It is assumed that the machine is in working order and that operating cycles have previously been carried out.

Under these conditions, if a coin is inserted in the apparatus 143 (FIG. 1), the contact 144 (FIG. 11) closes transitorily with the simultaneous result that the coil of the contactor 166 is energized from machine terminal 152 through wire 171 and from machine terminal 151 through contact 144 and wire 182 and the auxiliary motor 163 is energized first directly through contact 144 and wires 182 and 171 and thereafter through wire 171 and through contact 165, contact 166a and wire 174. The contact 165 is held in the closed position by the cam 164 during a period of rotation which corresponds to one revolution of said cam, with the result that the auxiliary motor 163 continues to be supplied with current, even after the opening of the coin contact 144, through the closed contact 166a of the contactor 166 and through contact 165. The short-time closure of the contact 166b causes the supply of current to the main motor 16 through wires 173 and 174 and to the coil of the contactor 167 during a certain period. The closure of the contact 167a of contactor 167 causes the self-supply of this latter through the intermediary of wires 173, 174 and contact 157 which is closed until completion of one full revolution of the cam 154.

The main motor 16 also continues to be supplied through the contact 167a, even when the contactor 166 is no longer energized due to the opening of the contact 165 which is operated by the cam 164 upon completion of its full revolution.

The energizing of the contactor 167 also causes the contact 167b to open, so that the operation of the push-button 168 becomes ineffectual while the main motor 16 is in operation.

As soon as the main motor 16 starts up, the cam 51 (FIGS. 6 and 7) is rotatably driven by shaft 14, while plate 21 is resiliently locked against rotation by spring-biassed ball 37. The slanting portion of cam 51 engages plunger 52 which forces plate 21 downwardly without rotating it, until key 44 engages into one of the four slots 46 (see also FIG. 8) which causes plate 21 to be indexed in unison with rotary shaft 14. Since the axis of plunger 52 is stationary upon completion of a quarter revolution of cam 51, plunger 52 is allowed to rise into the recess of cam 51 under the action of plate 21 being urged upwardly by spring 48. Plate 21, therefore, has achieved a quarter revolution and is again angularly locked by spring-biassed ball 37, while shaft 14 and cam 51 achieved the rest of their complete revolution. As a result of such compound fall, indexing and rising movement of the plate 21, the canister which was located at the compressing station B (the coffee powder contained therein having been compressed during the previous cycle of operation) accordingly moves to the percolating station C, whereupon plate 21 moves upwards again, with the result that the canister is forcibly applied against mouth 102 of the boiler by the finger 105 under the action of the cam 107.

The cam 155 which is mounted on the shaft 14 of the reduction unit 15 of the main motor 16 then actuates the contact set 158 by means of the first small-length boss 155a of said cam, with the result that the percolation electro-valve 102 is energized from machine terminal 152 through wires 171, 175 and from machine terminal 151 through wire 174, wire 176, contact 158, and wire 177. Hot water is conveyed under pressure from the boiler 101 and directed on to the compressed ground coffee contained in the canister 29. The ground coffee is thus wetted and undergoes a first swelling process. When the first boss 155a of the cam 155 leaves the contact 158, electro-valve 112 is deenergized and the flow of hot water stops and then resumes under the action of the second boss 155b of said cam. The full predetermined quantity of hot water is then discharged into the canister and after having percolated through the ground coffee, is then poured off into the coffee cup through the spout 65.

The cam 154 then causes the opening of the contact 157 and the consequential stoppage of the main motor 16. The coffee distribution cycle is accordingly terminated.

While the percolation water was distributed by the electro-valve 102, the washing water was distributed at electro-valve 102, the washing water or any suitable detergent liquid was distributed at station D by the electro-valve 122 simultaneously energized through wire 179 and contact 158 so that the canister which has now been brought to the washing station is freed from the used ground coffee which it contained and is washed under the action of the cold water under pressure projected by the sprinkler head or nozzle 121. The used grounds and the washing water are evacuated through the tray 128 and the pipe 129.

Moreover, after the plate 21 has carried out a pivotal movement through one quarter of a revolution and the percolation process has commenced, the cam 156 has caused the contact 159 to open for a certain period of time, with the result that the compressing electromagnet 86 is no longer energized via wires 174 and 175 during this period of time and has compressed the coffee grounds inside the preceding canister.

Finally, as a result of the excitation of the electro-valve 135 which is connected-up in parallel with the washing electro-valve 122, the metered quantity of sugar syrup has been fed into the coffee cup 134 during the flow of coffee at the percolating station.

If the user considers that the quantity of water which has been poured into the cup is not sufficient, he has the option of pressing push-button 168, causing the energization of hot water distribution valve 102 via wire 181 and contact 167b which is then closed, during the time and as long as pressure is applied to push-button 168.

The electrical characteristics of the machine as a whole are such that the time taken by the output shaft of the reduction gear unit of the auxiliary motor 163 to perform one complete revolution is much shorter than the time required by the output shaft 14 of the reduction unit 15 of the main motor 16 to perform one full revolution. Accordingly, after a full cycle has been performed, cam 164 of auxiliary motor 163 is always in a correct position to provide a generous margin for the initiation of a new cycle of operation.

It will be understood that the present invention is not limited to the embodiment which has been described and illustrated and which has been given by way of example, and that a large number of modifications can be made therein according to the applications which are contemplated, without thereby departing either from the scope or the spirit of the invention as defined by the claims.

What I claim is:

1. An automatic coffee-making machine comprising: a supply station for delivering a metered quantity of ground coffee including a ground coffee dispenser and first control means for energizing said ground coffee dispenser to dispense ground coffee; a compressing station for compressing said metered quantity of ground coffee including a compressing means and second control means for energizing said compressing means; a percolating station including a source of hot water under pressure, a distribution means for delivering hot water under pressure, said distribution means including an orifice of given cross-section, first valve means for connecting said source of hot water to said distributor means and means for supporting a coffee cup; a washing station including a source of wash liquid, a wash liquid dispensing means and second valve means connecting said source of wash liquid and said wash liquid dispensing means; said stations being disposed on the periphery of a circle and equiangularly displaced from each other; a plate; four canisters fixed to said plate in a circle and equiangularly displaced from each other, each of said canisters including a pierced base and an open top having a rim with a cross-section cooperatively engageable in a fluid-tight manner with the orifice of said distribution means; plate driving means supporting said plate so that said canisters are opposite said stations, said plate driving means including rotary drive means for rotating said plate in indexed steps so that each of said canisters is moved sequentially opposite each of said stations and axial drive means for axially moving said plate, said rotary drive means and said axial drive means cooperating when energized to, in sequence, more said plate away from said stations, to rotate said plate one-quarter of a revolution and to move said plate toward said stations; and means for energizing said first and second control means, said first and second valve means and said plate driving means in a prescribed sequence so that after each sequential movement of said plate, a first canister receives a metered quantity of ground coffee, a second canister preceding said first canister is subjected to a compressing action, a third canister preceding said second canister has its top rim applied in fluid-tight manner against the mouth of a said distributor means and accordingly serves for the percolation of the coffee which then flows directly through the pierced base of said third canister into the coffee cup placed therebeneath, and a fourth canister preceding said third canister is subjected to the washing operation.

2. The machine of claim 1, wherein said plate-driving means includes: a rotary drive shaft; means for causing said rotary drive shaft to perform only one full revolution when energized; said plate being a driven element and said rotary drive shaft being a driving element; a releasable coupling for connecting said driven element to said driving element, said releasable coupling comprising a longitudinal key secured to one of said elements, a coupling member secured to the other of said elements, said coupling member including four longitudinal slots 90° apart and adapted to receive on successive revolutions of said rotary drive shaft said key when said plate has moved away from said stations; and cam means secured to said rotary drive shaft for driving said plate away from said stations during a quarter of each revolution of said rotary drive shaft.

3. The automatic coffee-making machine as claimed in claim 2 in which said key is integral with said plate, said coupling member is integral with said rotary drive shaft and said cam means includes a cam integral with said rotary drive shaft, push-rod means following said cam and in urging contact with said plate, and spring means for biasing said plate against said push-rod means.

4. The automatic coffee-making machine as claimed in claim 2 including an elastic locking device for maintaining said plate in any of four angular positions.

5. The automatic coffee-making machine as claimed in claim 1, in which each canister: has a generally cylindrical shape; includes a grid disposed in the interior of said canister for supporting ground coffee and an elastic sealing joint having an inverted U section on the top rim of said canister; the orifice of said distribution means including an annular groove for accommodating said elastic sealing joint.

6. The automatic coffee-making machine as claimed in claim 2, in which said first and second valve means are first and second electro-valves and electric circuits for energizing said electro-valves, said electric circuits including movable contacts and there being cams integral with said rotary drive shaft for operating such contacts.

7. The automatic coffee-making machine as claimed in claim 6, in which the percolating station further comprises means for supplying sugar syrup, including a gravity-feed tank, an electro-valve for controlling the flow of syrup from said tank and an electric circuit means for actuating said electro-valve comprising a cam operated contact and a cam integral with said rotary drive shaft.

8. The automatic coffee-making machine as claimed in claim 2, further comprising a motor for driving said rotary drive shaft and an electric circuit means for energizing said motor, said circuit means including a cam operated contactor, a cam and an auxiliary motor for driving said cam, the cycle of said auxiliary motor being of shorter duration than that of the cycle of the motor driving said rotary drive shaft.

9. The automatic coffee-making machine as claimed in claim 1, in which the washing station includes a sprinkler head through which wash liquid under pressure is adapted to flow so as to be projected into a canister and to eliminate the used coffee inside said canister.

10. The automatic coffee-making machine as claimed in claim 5, in which a canister located at the percolating station and applied against the orifice of said distribution means through which the hot water under pressure is discharged is locked in position by cam means operable from said plate driving means.

11. The automatic coffee-making machine as claimed in claim 7, in which the electric circuit controlling said first electro-valve for the admission of hot water to the percolating station additionally comprises a push-button contact means which permits the supplying of an additional quantity of hot water to said percolating station.

12. The automatic coffee-making machine as claimed in claim 11, in which said push-button means is supplied with current by an electric contact which closes only when a cycle of operation of the machine is completed.

13. The automatic coffee-making machine as claimed in claim 6, in which the cam which controls the electro-valve controlling the flow of hot water in said percolating station has a profile designed to produce a first flow of very short duration for wetting the ground coffee, said first flow being followed a given time later by a second flow in which the entire quantity of hot water which is necessary is then delivered.

14. The automatic coffee-making machine as claimed in claim 8, in which the electric circuit for the initial excitation of the motor of the machine at the start of a cycle of operation comprises a coin operated contact means.

References Cited in the file of this patent

UNITED STATES PATENTS

| | | |
|---|---|---|
| 2,898,844 | Gaggia | Aug. 11, 1959 |
| 3,019,719 | Parraga | Feb. 6, 1962 |
| 3,055,286 | Valente | Sept. 25, 1962 |

FOREIGN PATENTS

| | | |
|---|---|---|
| 496,595 | Italy | July 23, 1954 |
| 508,269 | Italy | Jan. 5, 1955 |
| 566,811 | Italy | Sept. 17, 1957 |